United States Patent
Lin et al.

(10) Patent No.: US 8,169,198 B2
(45) Date of Patent: May 1, 2012

(54) ANTI-RING ASYNCHRONOUS BOOST CONVERTER AND ANTI-RING METHOD FOR AN ASYNCHRONOUS BOOST CONVERTER

(75) Inventors: Shui-Mu Lin, Taichung County (TW); Jien-Sheng Chen, Miaoli County (TW); Kwan-Jen Chu, Hsinchu (TW); Tsung-Wei Huang, Taipei (TW); Chao-Hsuan Chuang, Jhubei (TW)

(73) Assignee: Richtek Technology Corp., Hsinchu (TW)

( * ) Notice: Subject to any disclaimer, the term of this patent is extended or adjusted under 35 U.S.C. 154(b) by 923 days.

(21) Appl. No.: 12/219,561

(22) Filed: Jul. 24, 2008

(65) Prior Publication Data
US 2009/0027027 A1    Jan. 29, 2009

(30) Foreign Application Priority Data
Jul. 26, 2007    (TW) .............................. 96127342 A

(51) Int. Cl.
G05F 1/00    (2006.01)
(52) U.S. Cl. ........................................ 323/222; 323/271

(58) Field of Classification Search .................. 323/222, 323/223, 271, 272, 276, 282, 283
See application file for complete search history.

(56) References Cited

U.S. PATENT DOCUMENTS

| | | | | | |
|---|---|---|---|---|---|
| 4,942,312 | A | * | 7/1990 | Stevens | 327/543 |
| 5,610,451 | A | * | 3/1997 | Symonds | 307/66 |
| 6,396,250 | B1 | * | 5/2002 | Bridge | 323/283 |
| 7,633,275 | B2 | * | 12/2009 | Leyk et al. | 323/224 |
| 2004/0080303 | A1 | * | 4/2004 | Nishimaki | 323/282 |
| 2006/0017421 | A1 | * | 1/2006 | Solie et al. | 323/225 |
| 2006/0103365 | A1 | * | 5/2006 | Ben-Yaacov | 323/313 |
| 2007/0170897 | A1 | * | 7/2007 | Williams | 323/222 |

* cited by examiner

*Primary Examiner* — Adolf Berhane
*Assistant Examiner* — Nguyen Tran
(74) *Attorney, Agent, or Firm* — Rosenberg, Klein & Lee

(57) ABSTRACT

The phase node voltage or the PWM signal in an asynchronous boost converter is monitored to detect a phase node voltage ringing. When a phase node voltage ringing is detected, a detection signal is asserted to establish a bypass path to bypass the inductor of the converter. A charge bypass circuit is shunt to the inductor, and controlled by the detection signal to establish the bypass path. Due to the bypass path, the phase node voltage is maintained at a constant, and the phase node voltage radiation and input/output noise are eliminated.

30 Claims, 17 Drawing Sheets

ANTI-RING ASYNCHRONOUS BOOST CONVERTER AND ANTI-RING METHOD FOR AN ASYNCHRONOUS BOOST CONVERTER

FIELD OF THE INVENTION

The present invention is related generally to a voltage converter and, more particularly, to an asynchronous boost converter.

BACKGROUND OF THE INVENTION

FIG. 1 shows a conventional asynchronous boost converter 100, in which an inductor L1 is connected between a power input VIN and a phase node LX, a power switch 104 is connected between the phase node LX and ground GND, a diode D1 is connected between the phase node LX and a power output VOUT, a capacitor COUT is connected between the power output VOUT and ground GND, and a controller 102 provides a pulse width modulation (PWM) signal to switch the power switch 104 to convert the input voltage VIN to an output voltage VOUT. In the controller 102, voltage divider resistors R1 and R2 divide the output voltage VOUT to generate a feedback voltage VFB, an error amplifier 114 generates an error signal EA according to the difference between the feedback voltage VFB and a reference voltage VREF, a comparator 110 generates a signal COMP according to the error signal EA and a ramp signal RAMP, a flip-flop 108 generates the PWM signal according to the signal COMP and a clock CLK provided by an oscillator 106, and a gate driver 112 switches the power switch 104 in response to the PWM signal, so as to regulate the inductor current IL1.

FIG. 2 is a waveform diagram showing the inductor current IL1 and some corresponding signals in the converter 100 of FIG. 1, in which waveform 150 represents the PWM signal, waveform 152 represents the phase node voltage LX, and waveform 154 represents the inductor current IL1. Referring to FIGS. 1 and 2, during the on-time of the PWM signal, the power switch 104 is on, and the inductor current IL1 increases. When the PWM signal switches to low, the power switch 104 is turned off, the inductor current IL1 starts to fall down, and the phase node voltage LX is pulled high. Then, when the inductor current IL1 discharges such that the inductor L1 and the parasitic capacitors in the diode D1 and on the phase node LX become an oscillation circuit, LX ringing occurs, as shown by the part circled by the dashed lines in the waveforms 152 and 154 of FIG. 2.

FIG. 3 is a partially enlarged view of the waveforms 152 and 154 in FIG. 2, and FIGS. 4 to 6 illustrate the charge and discharge of the inductor L1 during the LX ringing period. Referring to FIGS. 3 to 6, when the PWM signal switches to low, the power switch 104 is turned off, the inductor current IL1 starts to fall down, and the phase node voltage LX is pulled high. When the inductor current IL1 falls down to zero, as shown at time t1, the phase node voltage LX starts to fall down, and the parasitic capacitors CD and CP in the diode D1 and on the phase node LX will charge the inductor L1, as shown in FIG. 4. At time t2, the phase node voltage LX equals to the input voltage VIN, and the inductor current IL1 reaches its valley. Then, the phase node voltage LX continues falling down until it is lower than the ground potential by a threshold, the body diode 116 of the power switch 104 becomes conductive, as shown at time t3, and the inductor current IL1 begins to flow from ground GND to the inductor L1, as shown in FIG. 5. However, the conductive body diode 116 will clamp the phase node voltage LX at a constant. When the inductor current IL1 increases to be greater than zero, as shown at time t4, the body diode 116 of the power switch 104 is cut off and the inductor L1 starts to discharge to the parasitic capacitors CD and CP, as shown in FIG. 6. Then, the phase node voltage LX starts to raise up until the inductor current IL1 is lower than zero again, as shown at time t5, and thereafter, the process of charge and discharge shown in FIGS. 4 to 6 is repeated. The parasitic charging and discharging the inductor L1 cause the LX ringing, and thus result in LX radiation (EMI) and input/output noise (parasitic coupling).

Therefore, it is desired an anti-ring method and apparatus for an asynchronous boost converter.

SUMMARY OF THE INVENTION

An object of the present invention is to provide an anti-ring asynchronous boost converter.

Another object of the present invention is to provide an anti-ring method for an asynchronous boost converter.

According to the present invention, an anti-ring asynchronous boost converter has a charge bypass circuit shunt to the inductor, and a detector connected to the phase node or the gate of the power switch in order to signal the charge bypass circuit to bypass the inductor when an LX ringing is detected.

According to the present invention, an anti-ring method for an asynchronous boost converter includes monitoring the phase node voltage or the PWM signal of the asynchronous boost converter to detect LX ringing, and bypassing the inductor of the asynchronous boost converter when an LX ringing is detected.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
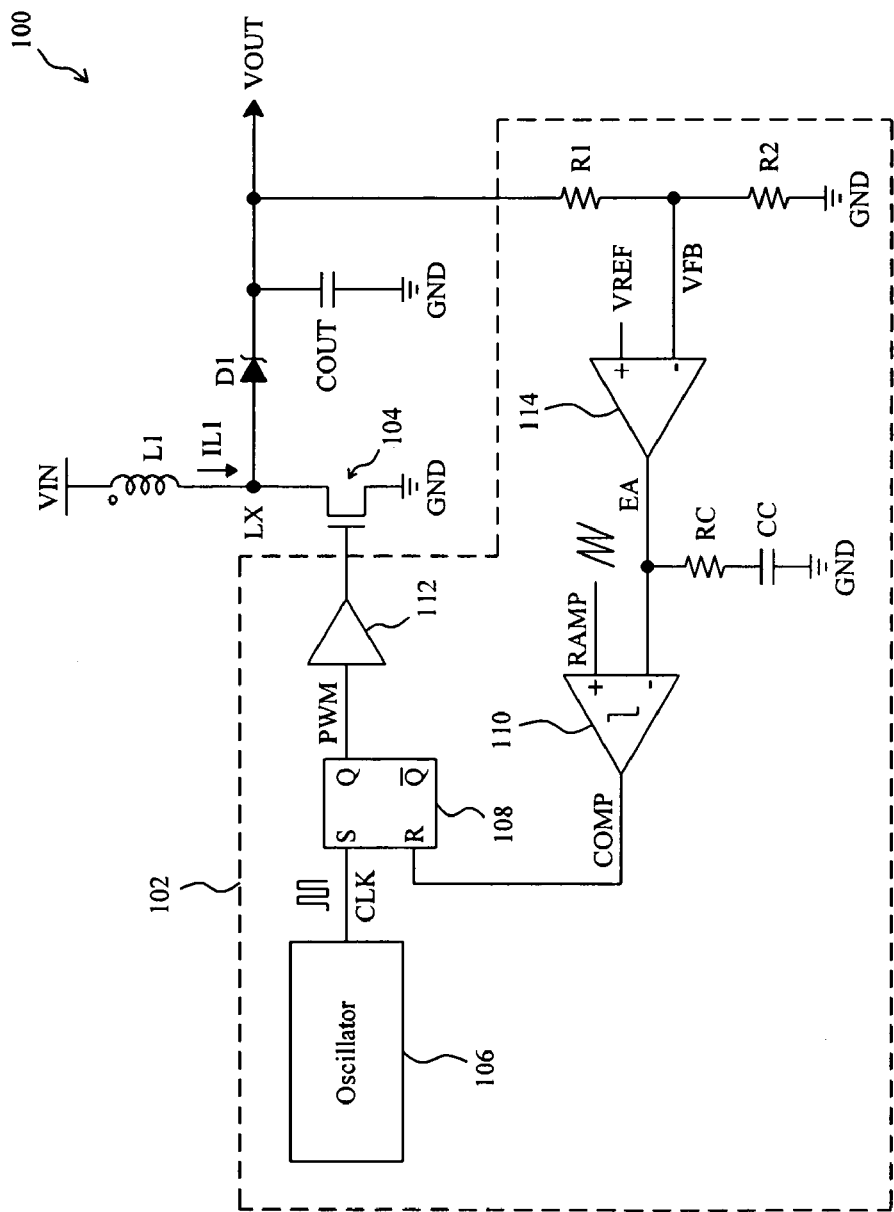
FIG. 1 is a conventional asynchronous boost converter.
Figure 7:
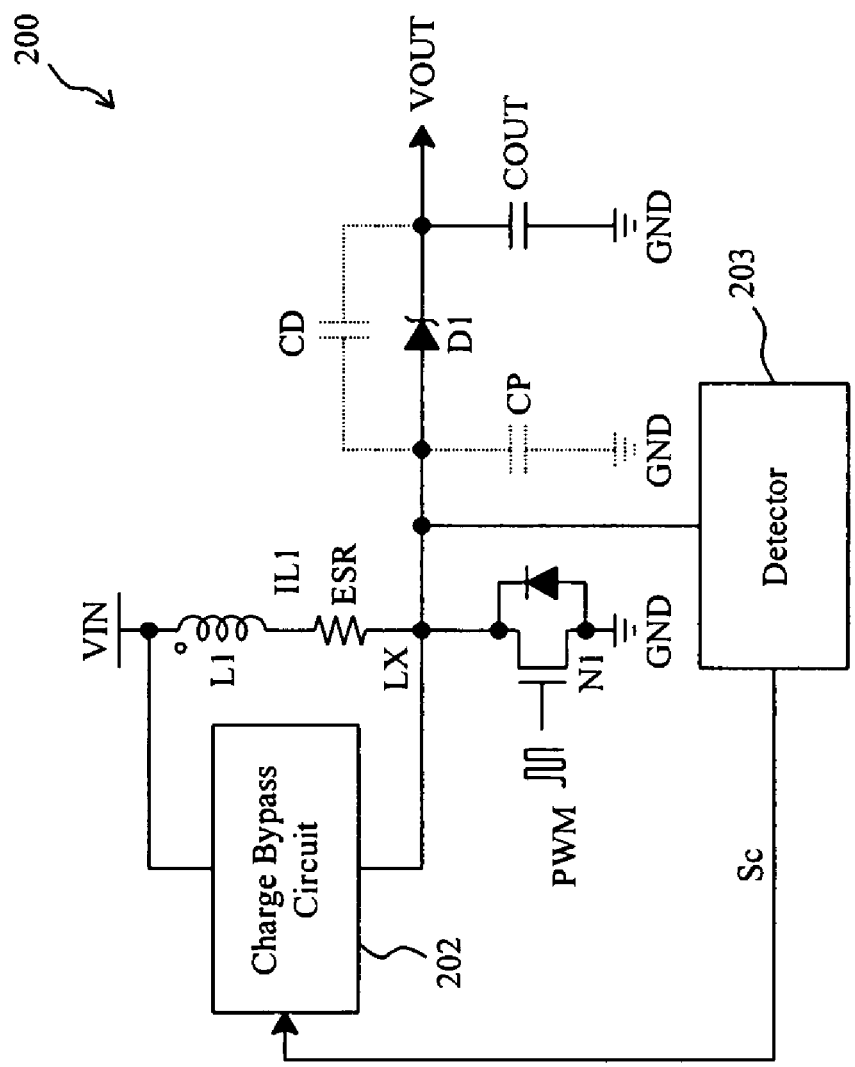
FIG. 7 is a first embodiment of asynchronous boost converter according to the present invention.

In a first embodiment having the same output stage of FIG. 1, as shown in FIG. 7, an asynchronous boost converter 200 according to the present invention further includes a charge bypass circuit 202 shunt to the inductor L1 and a detector 203 connected to the phase node LX. Likewise, the capacitor CD represents the parasitic capacitor in the diode D1, and the capacitor CP represents the parasitic capacitor on the phase node LX. The detector 203 monitors the phase node voltage LX to assert a detection signal Sc to control the charge bypass circuit 202. When the detector 203 detects an LX ringing, the detection signal Sc will control the charge bypass circuit 202 to establish a bypass path between the power input VIN and the phase node LX, and thus maintain the phase node voltage LX at the level of the input voltage VIN.

Figure 2:
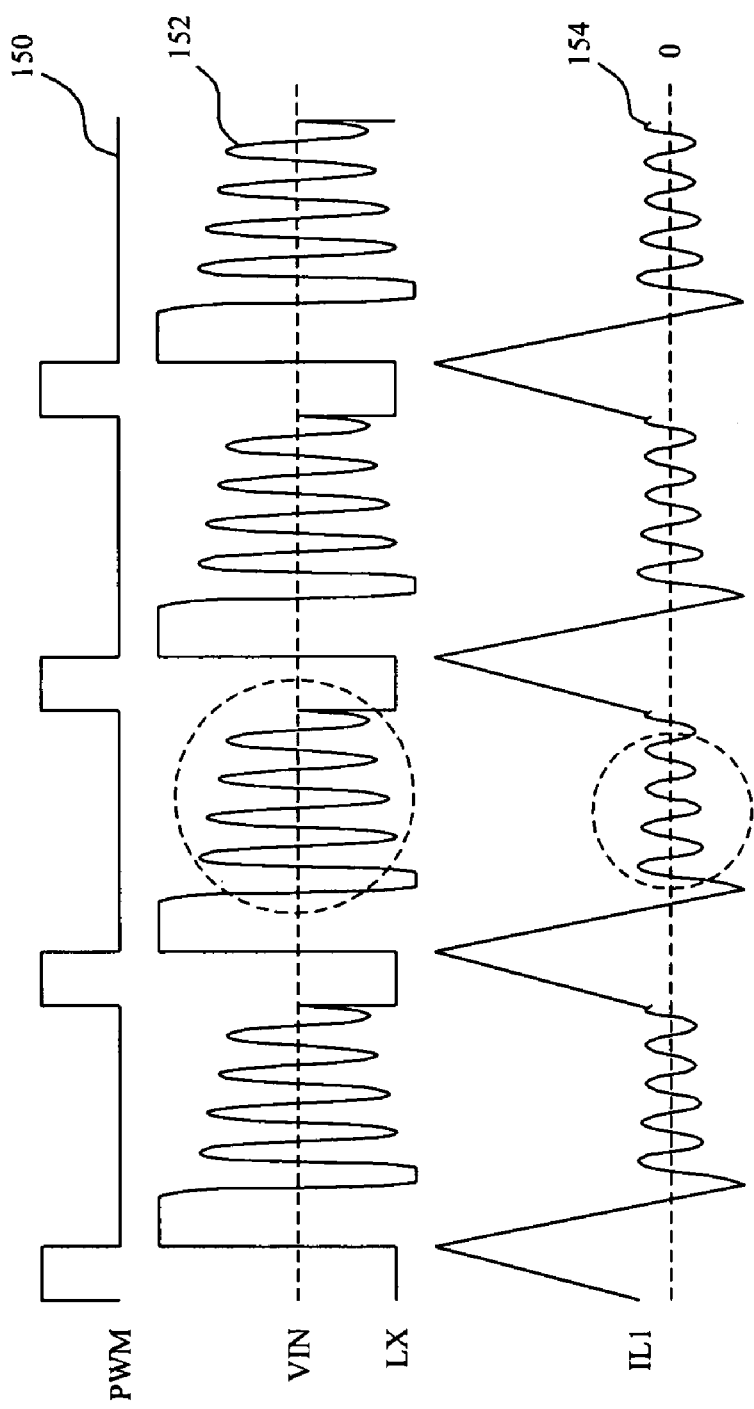
FIG. 2 is a waveform diagram showing the inductor current and some corresponding signals in the converter of FIG. 1.
Figure 4:
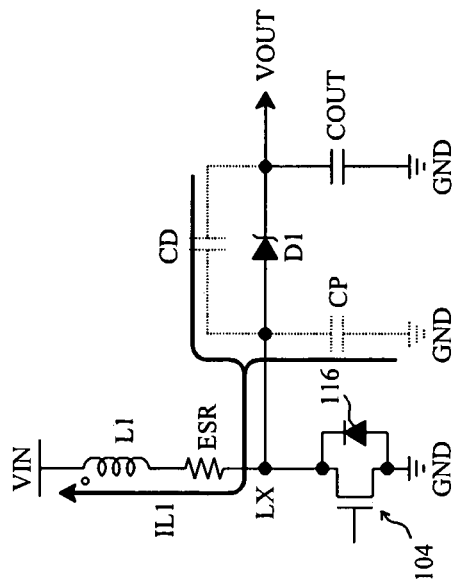
FIG. 4 is the state of the converter of FIG. 1 when the parasitic capacitors charge the inductor.
Figure 3:
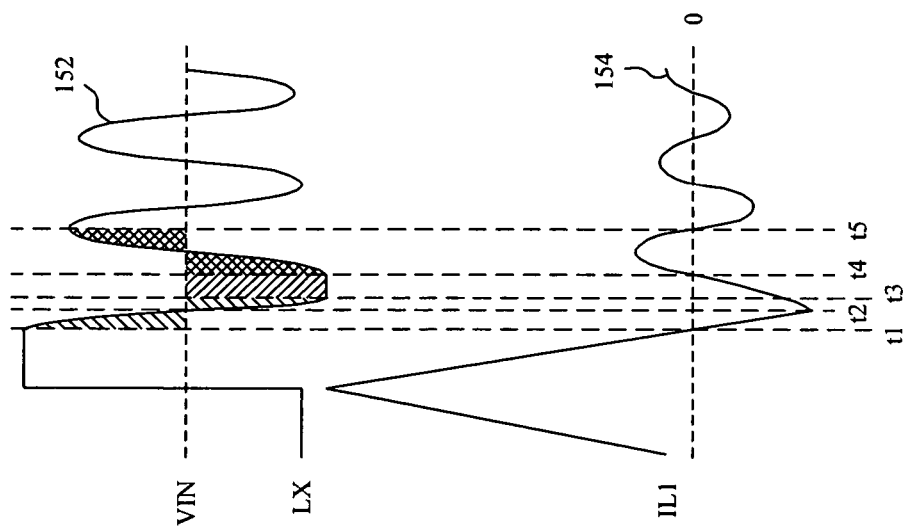
FIG. 3 is a partially enlarged view of the waveforms shown in FIG. 2.
Figure 6:
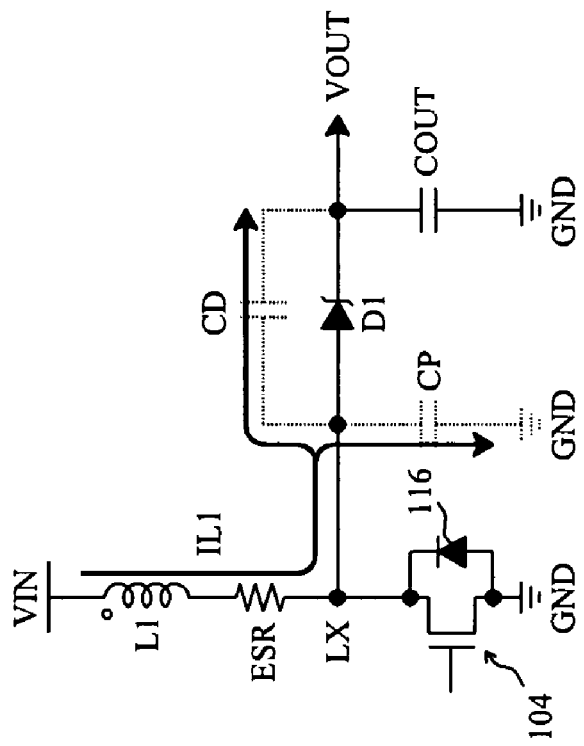
FIG. 6 is the state of the converter of FIG. 1 when the inductor L1 discharges to the parasitic capacitors.
Figure 5:
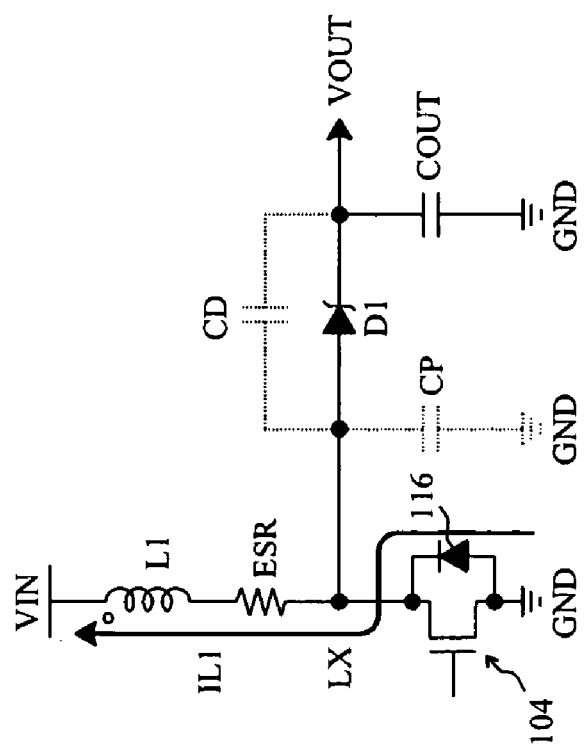
FIG. 5 is the state of the converter of FIG. 1 when the body diode of the power switch is conductive.
Figure 8:
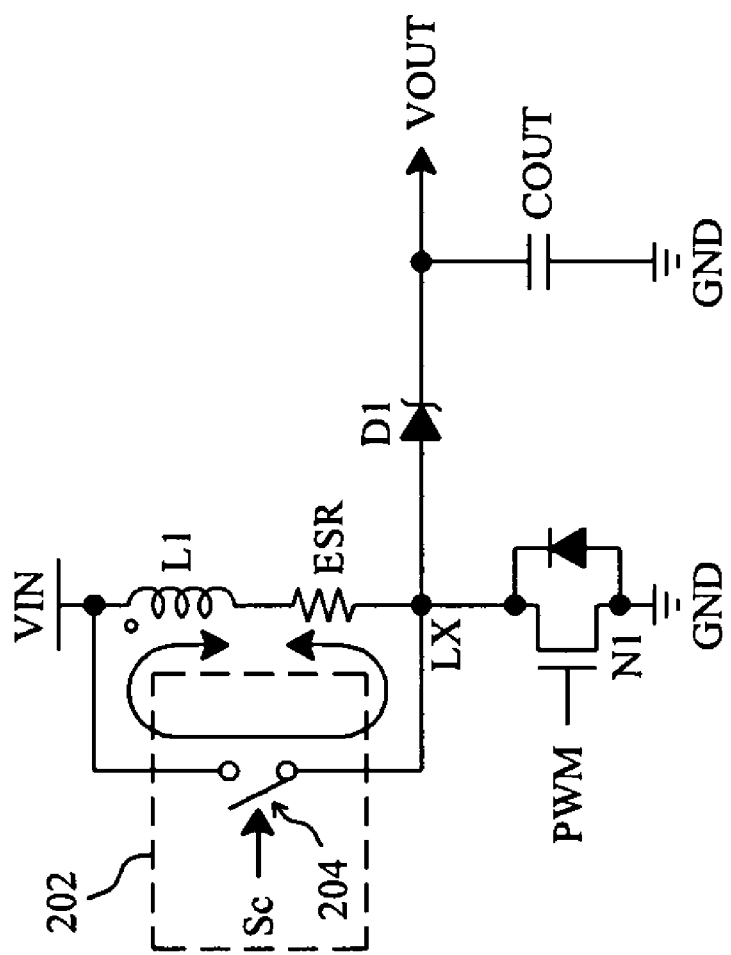
FIG. 8 is a first embodiment for the charge bypass circuit in the converter of FIG. 7.
Figure 9:
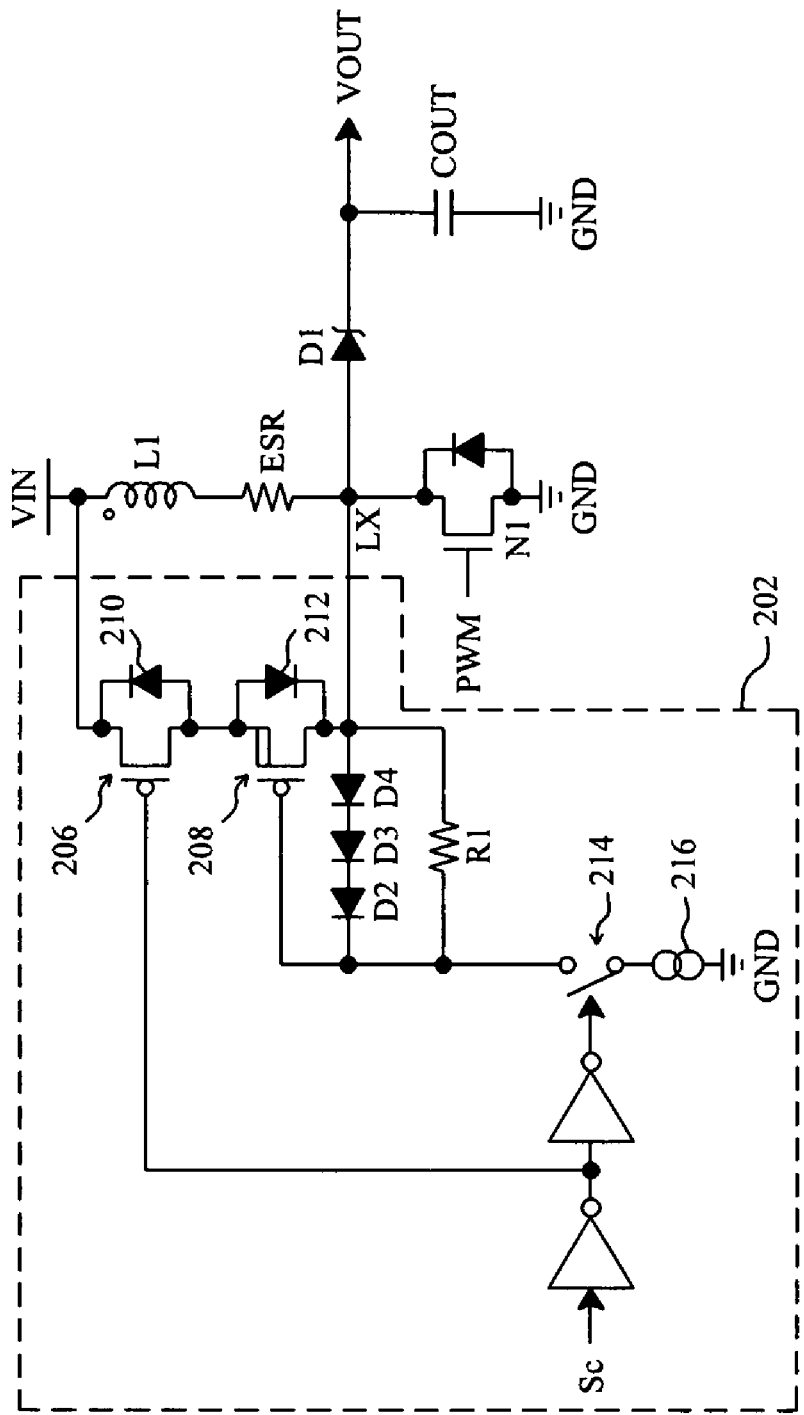
FIG. 9 is a second embodiment for the charge bypass circuit in the converter of FIG. 7.

FIG. 8 provides a first embodiment for the bypass circuit 202 in the converter 200 of FIG. 7, which includes a switch 204 controlled by the detection signal Sc. The switch 204 is connected between the power input VIN and the phase node LX, and when the switch 204 is on, a bi-directional bypass path is established to bypass the inductor L1. FIG. 9 is a second embodiment for the bypass circuit 202 in the converter 200 of FIG. 7, which includes PMOS transistors 206 and 208 serially connected between the power input VIN and the phase node LX, having body diodes 210 and 212 respectively, a diode string D2-D4 connected between the phase node LX and the gate of the PMOS transistor 208, a resistor R1 shunt to the diode string D2-D4, and a switch 214 connected between the gate of the PMOS transistor 208 and a current source 216. The PMOS transistor 208 is normally off because the resistor R1 pulls high the gate voltage thereof. The diode string D2-D4 clamps the gate voltage of the PMOS transistor 208 within a range that the gate of the PMOS transistor 208 could sustain. The current source 216 is used to turn on the PMOS transistor 208 when the switch 214 is on. Since the phase node voltage LX may be higher than the input voltage VIN, as shown by the waveform 152 in FIG. 2, the PMOS transistor 208 employed in this embodiment is a high voltage component. In addition, the body diodes 210 and 212 are arranged back to back, in order to prevent them from being conductive so as to establish a bypass path therethrough between the power input VIN and the phase node LX when the PMOS transistors 206 and 208 are both off. In response to the detection signal Sc transiting to high, the PMOS transistor 206 and the switch 214 both turn on, the gate of the PMOS transistor 208 is connected to the current source 216, and thus the PMOS transistor 208 is turned on. As a result, a bypass path is established between the power input VIN and the phase node LX through the PMOS transistors 206 and 208. In this case, the combination of the PMOS transistor 208 and the current source 216 is equivalent to a current mirror, the PMOS transistor 206 is equivalent to a resistor, and the PMOS transistor 208 is equivalent to a current source. When the phase node voltage LX is higher than the input voltage VIN, the bypass current flows from the phase node LX to the power input VIN through the PMOS transistor 208, and when the phase node voltage LX is lower than the input voltage VIN, the bypass current flows from the power input VIN to the phase node LX through the body diode 212 of the PMOS transistor 208.

Figure 10:
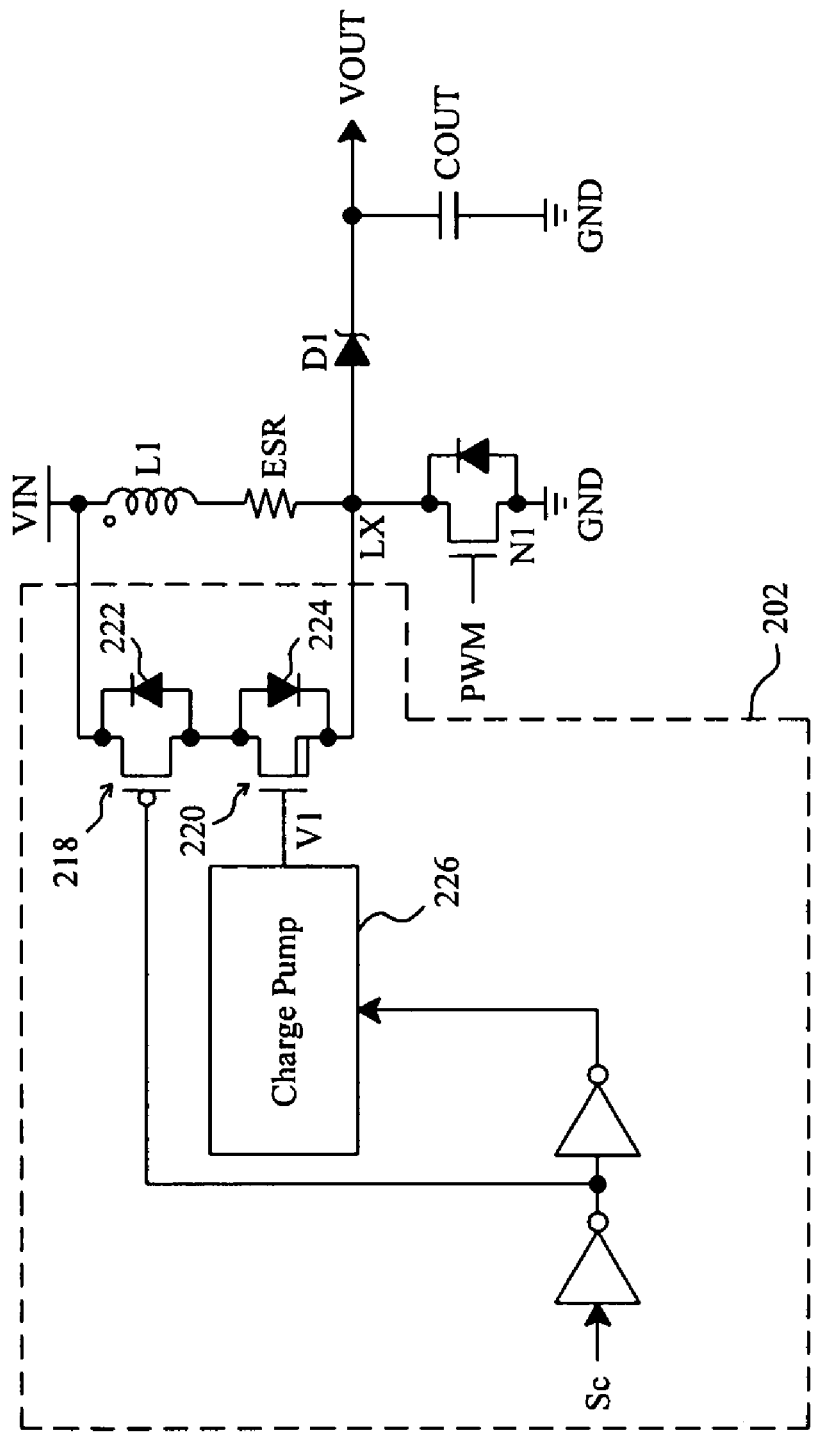
FIG. 10 is a third embodiment for the charge bypass circuit in the converter of FIG. 7.

FIG. 10 is a third embodiment for the bypass circuit 202 in the converter 200 of FIG. 7, which includes a PMOS transistor 218 and an NMOS transistor 220 serially connected between the power input VIN and the phase node LX, having body diodes 222 and 224 respectively, and a charge pump 226 to provide a gate voltage V1 to switch the NMOS transistor 220 according to the detection signal Sc. When an LX ringing is detected, the detection signal Sc transits to high and thus turns on the PMOS transistor 218. After the PMOS transistor 218 turns on, the source voltage of the NMOS transistor 220 becomes the level of the input voltage VIN, and thus the charge pump 226 is required to provide a gate voltage V1 higher than the input voltage VIN in order to turn on the NMOS transistor 220 slightly. In this case, the PMOS transistor 218 is equivalent to a resistor, and the NMOS transistor 220 is equivalent to a current source. When the phase node voltage LX is higher than the input voltage VIN, the bypass current flows from the phase node LX to the power input VIN through the NMOS transistor 220, and when the phase node voltage LX is lower than the input voltage VIN, the bypass current flows from the power input VIN to the phase node LX through the body diode 224 of the NMOS transistor 220. In this embodiment, likewise, the NMOS transistor 220 is a high voltage component, and the body diodes 222 and 224 are arranged back to back.

Figure 11:
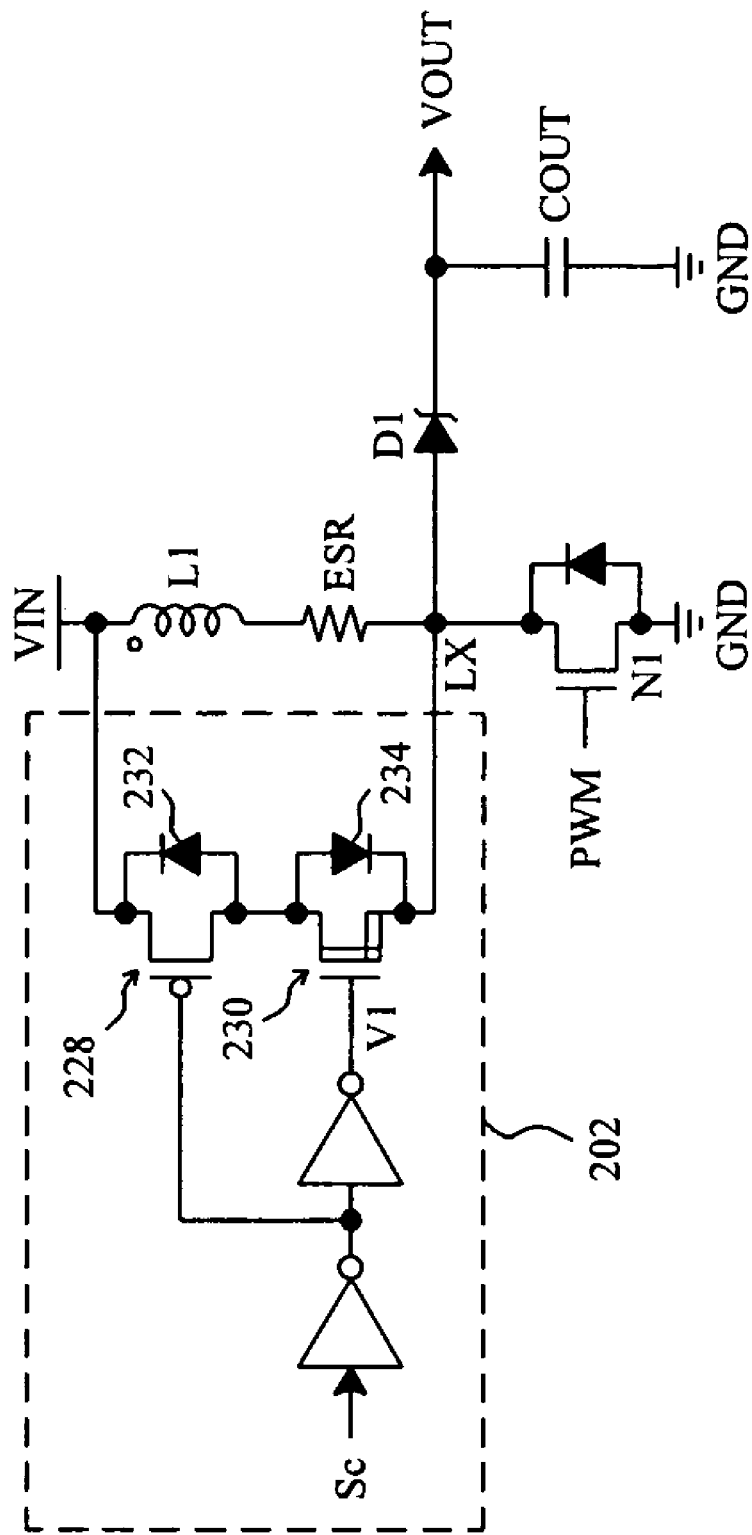
FIG. 11 is a fourth embodiment for the charge bypass circuit in the converter of FIG. 7.

FIG. 11 is a fourth embodiment for the bypass circuit 202 in the converter 200 of FIG. 7, which includes a PMOS transistor 228 and a depletion NMOS transistor 230 serially connected between the power input VIN and the phase node LX, having body diodes 232 and 234 respectively. When an LX ringing is detected, the detection signal Sc becomes high and thereby turns on the transistors 228 and 230 to establish a bidirectional bypass path between the power input VIN and the phase node LX, which will maintain the phase node voltage LX at the level of the input voltage VIN. Further, when the detection signal Sc is high such that the transistors 228 and 230 are both on, the PMOS transistor 228 is equivalent to a resistor and the NMOS transistor 230 is equivalent to a current source. In this case, when the phase node voltage LX is higher than the input voltage VIN, the bypass current flows from the phase node LX to the power input VIN through the NMOS transistor 230, and when the phase node voltage LX is lower than the input voltage VIN, the bypass current flows from the power input VIN to the phase node LX through the body diode 234 of the NMOS transistor 230. In this embodiment, likewise, the NMOS transistor 230 is a high voltage component, and the body diodes 232 and 234 are arranged back to back.

Figure 12:
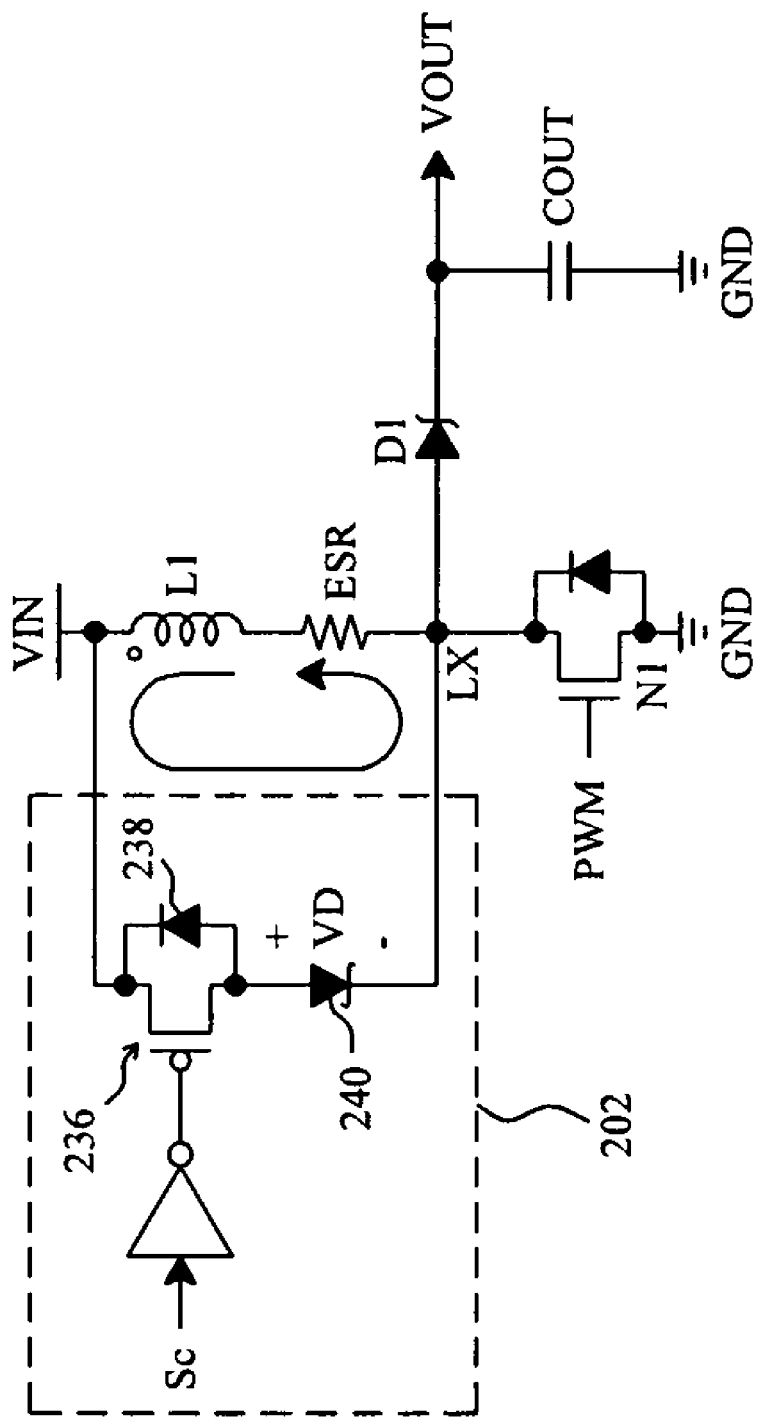
FIG. 12 is a fifth embodiment for the charge bypass circuit in the converter of FIG. 7.

FIG. 12 is a fifth embodiment for the bypass circuit 202 in the converter 200 of FIG. 7, which includes a PMOS transistor 236 and a diode 240 serially connected between the power input VIN and the phase node LX. When an LX ringing is detected, the detection signal Sc becomes high and thereby turns on the PMOS transistor 236 to establish a one-directional bypass path between the power input VIN and the phase node LX. In this case, the PMOS transistor 236 is equivalent to a resistor, and when the input voltage VIN is higher than the phase node voltage LX, the bypass current flows from the power input VIN to the phase node LX through the PMOS transistor 236 and the diode 240. The PMOS transistor 236 has a body diode 238, and the body diode 238 and the diode 240 are arranged back to back to prevent the body diode 238 from being conductive to establish a bypass path when the PMOS transistor 236 is off. In other embodiments, the diode 240 can be replaced by a body diode of a transistor.

Figure 13:
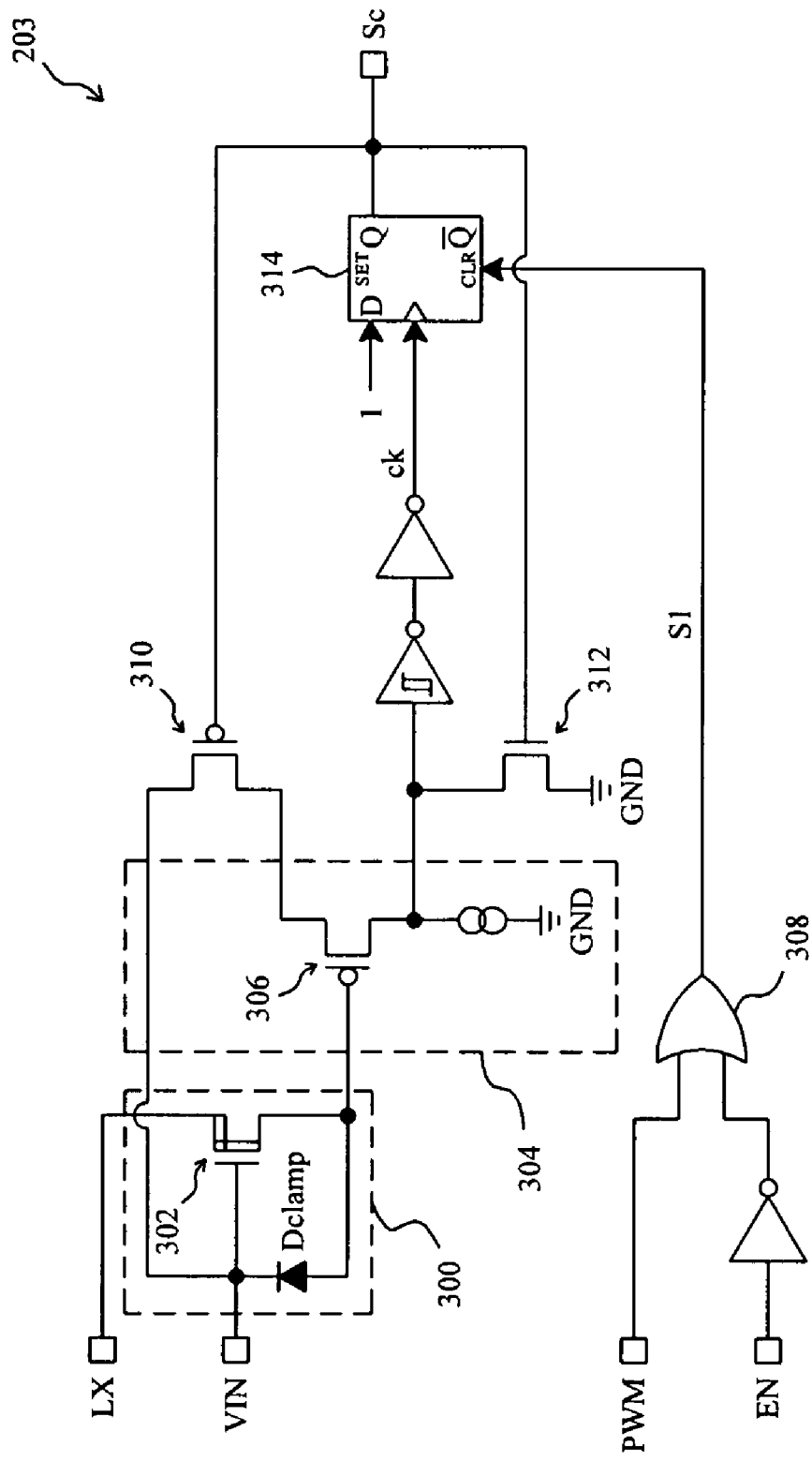
FIG. 13 is a first embodiment for the detector in the converter FIG. 7.

FIG. 13 is a first embodiment for the detector 203 in the converter 200 of FIG. 7, in which a high voltage blocking circuit 300 is connected between the phase node LX and a comparator 304 to isolate high voltage, the comparator 304 triggers an indication signal ck according to the phase node voltage LX, an OR gate 308 produces a signal S1 according to the PWM signal and an enable signal EN to enable the detector 203, a PMOS transistor 310 controlled by the detection signal Sc is connected between the power input VIN and the PMOS transistor 306 in the comparator 304, an NMOS transistor 312 controlled by the detection signal Sc is connected between the output of the comparator 304 and ground GND, and a flip-flop 314 asserts the detection signal Sc according to the signals ck and S1. The high voltage blocking circuit 300 includes an NMOS transistor 302 connected between the phase node LX and the gate of the PMOS transistor 306 in the comparator 304, and a diode Dclamp connected between the gate and the source of the NMOS transistor 302. The NMOS transistor 302 is a high voltage component. When the PMOS transistor 310 turns on, the source voltage of the PMOS transistor 306 equals to the input voltage VIN. According to the characteristics of PMOS transistor, when the difference between the gate voltage and the source voltage of the PMOS transistor 306 is less than the threshold voltage VTP of the PMOS transistor 306, the PMOS transistor 306 will turn on and trigger the indication signal ck. Thus, when the phase node voltage LX is lower than the voltage Vr=VIN−VTP, the PMOS transistor 306 will turn on.

Figure 14:
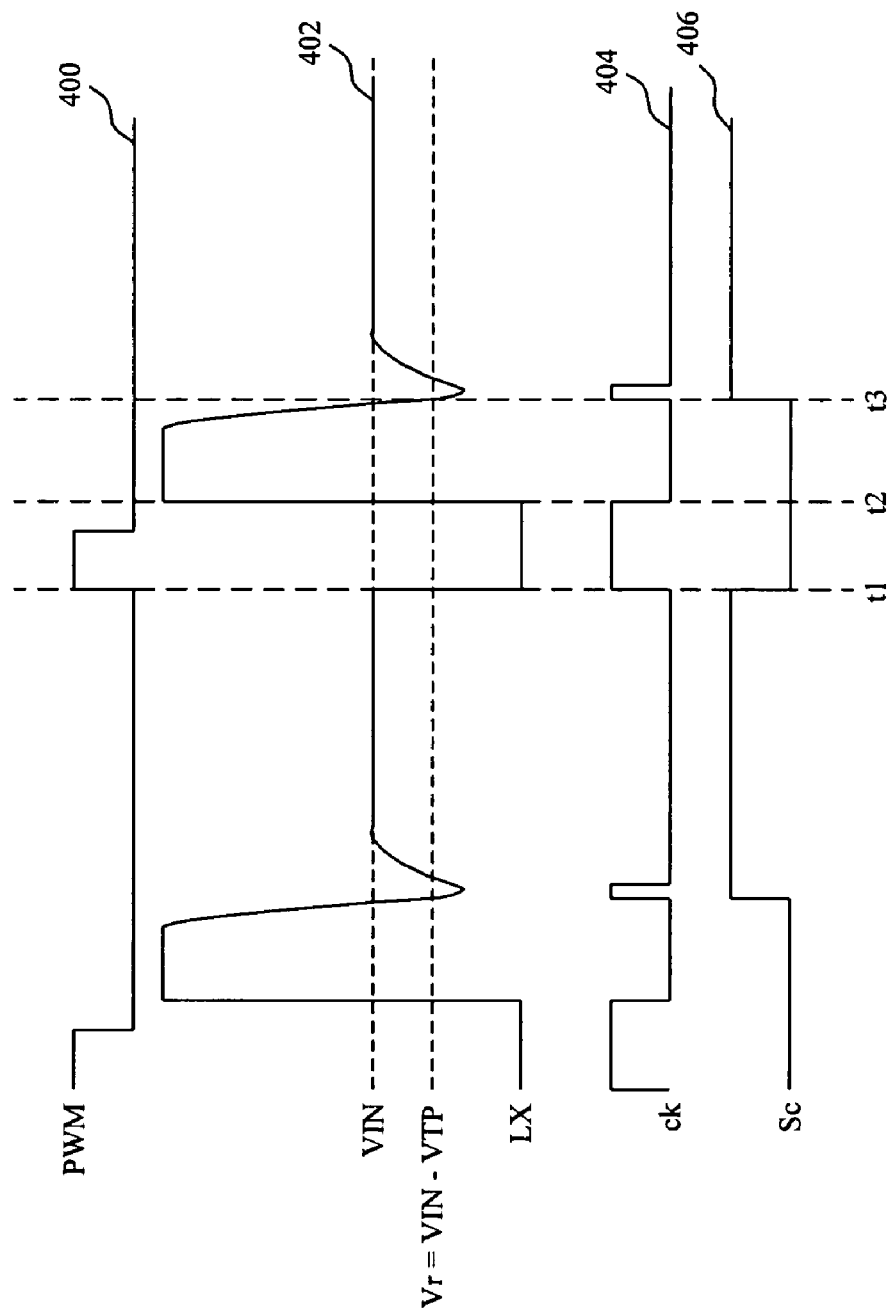
FIG. 14 is a waveform diagram showing the phase node voltage and some corresponding signals in the detector of FIG. 13.

FIG. 14 is a waveform diagram showing the phase node voltage LX and some corresponding signals in the detector 203 of FIG. 13, in which waveform 400 represents the PWM signal, waveform 402 represents the phase node voltage LX, waveform 404 represents the indication signal ck, and waveform 406 represents the detection signal Sc. Referring to FIGS. 7, 13 and 14, at time t1 the PWM signal transits to high and turns on the power switch N1 accordingly, and at this moment the phase node voltage LX is lower than the voltage Vr, and thus the indication signal ck transits to high. Since the PWM signal is high, the output Sc of the flip-flop 314 will be low. After the power switch N1 turns off, the phase node voltage LX is pulled higher to exceed the voltage Vr, as shown at time t2, and thus the indication signal ck transits to low. Then, if the phase node voltage LX becomes lower than the voltage Vr again, as shown at time t3, the PMOS transistor 306 will turn on again and so activate the indication signal ck to be high, and because the PWM signal at this moment is low, the flip-flop 314 will trigger the detection signal Sc to be high. As a result, the detection signal Sc will control the charge bypass circuit 202 to establish a bypass path therethrough, and then the phase node voltage LX is maintained at the level of the input voltage VIN, as shown by the waveform 402.

Figure 15:
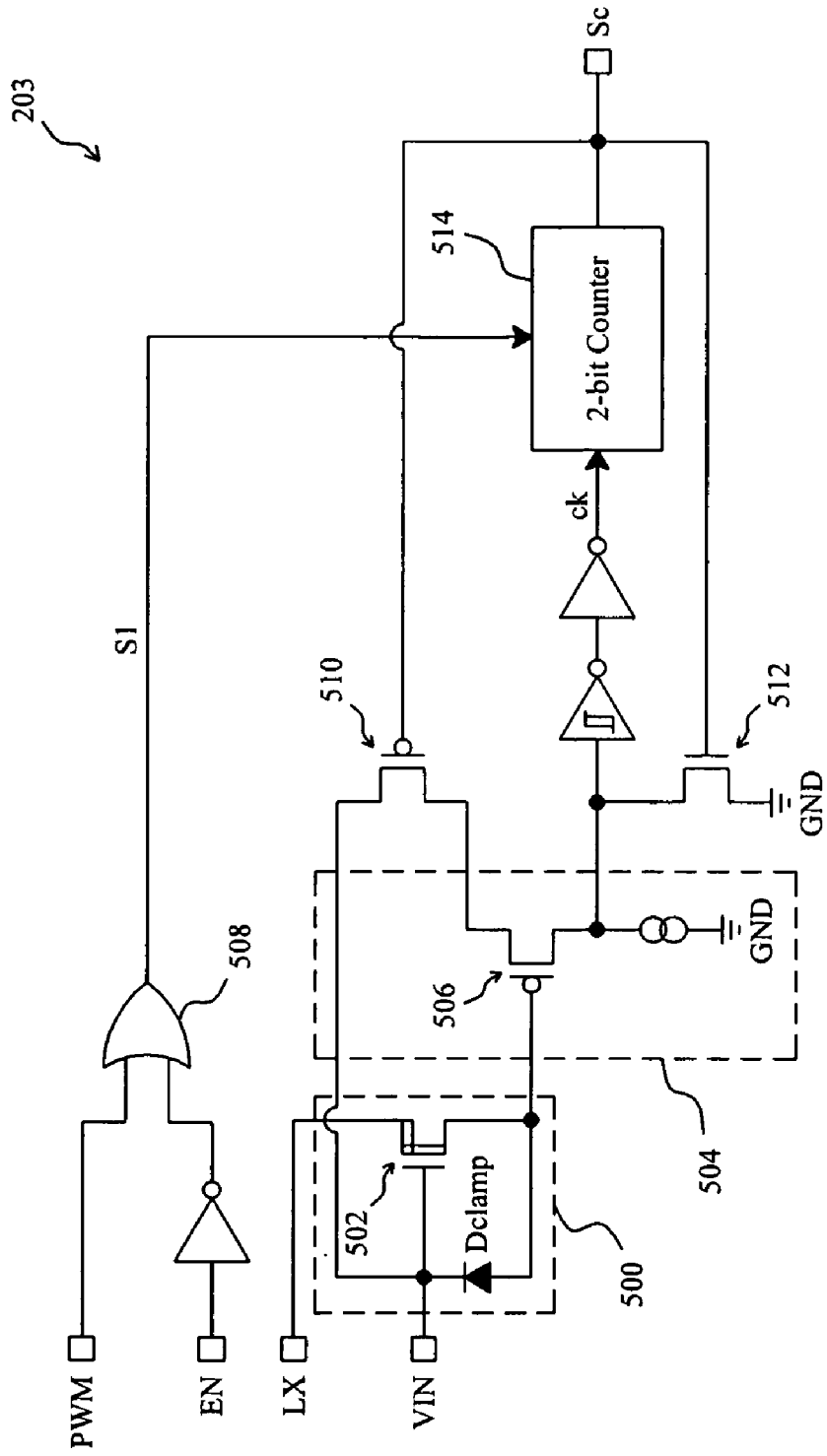
FIG. 15 is a second embodiment for the detector in the converter FIG. 7.

FIG. 15 is a second embodiment for the detector 203 in the converter 200 of FIG. 7, in which a high voltage blocking circuit 500, a comparator 504, an OR gate 508, a PMOS transistor 510, and an NMOS transistor 512 are configured as that of FIG. 13. However, a 2-bit counter 514 is used instead, to assert the detection signal Sc according to the signals ck and S1. Likewise, the NMOS transistor 502 in the high voltage blocking circuit 500 is a high voltage component. When the transistors 502 and 510 both turn on, the gate and the source of the PMOS transistor 506 are connected to the phase node LX and the power input VIN respectively. According to the characteristics of PMOS transistor, when the phase node voltage LX is lower than the voltage Vr=VIN−VTP, the PMOS transistor 506 will turn on and thereby activate the indication signal ck to be high. When the NMOS transistor 512 is turned on by the detection signal Sc, the indication signal ck is pulled low. After the 2-bit counter 514 is enabled by the signal S1, it will count the indication signal ck to assert the detection signal Sc.

Figure 16:
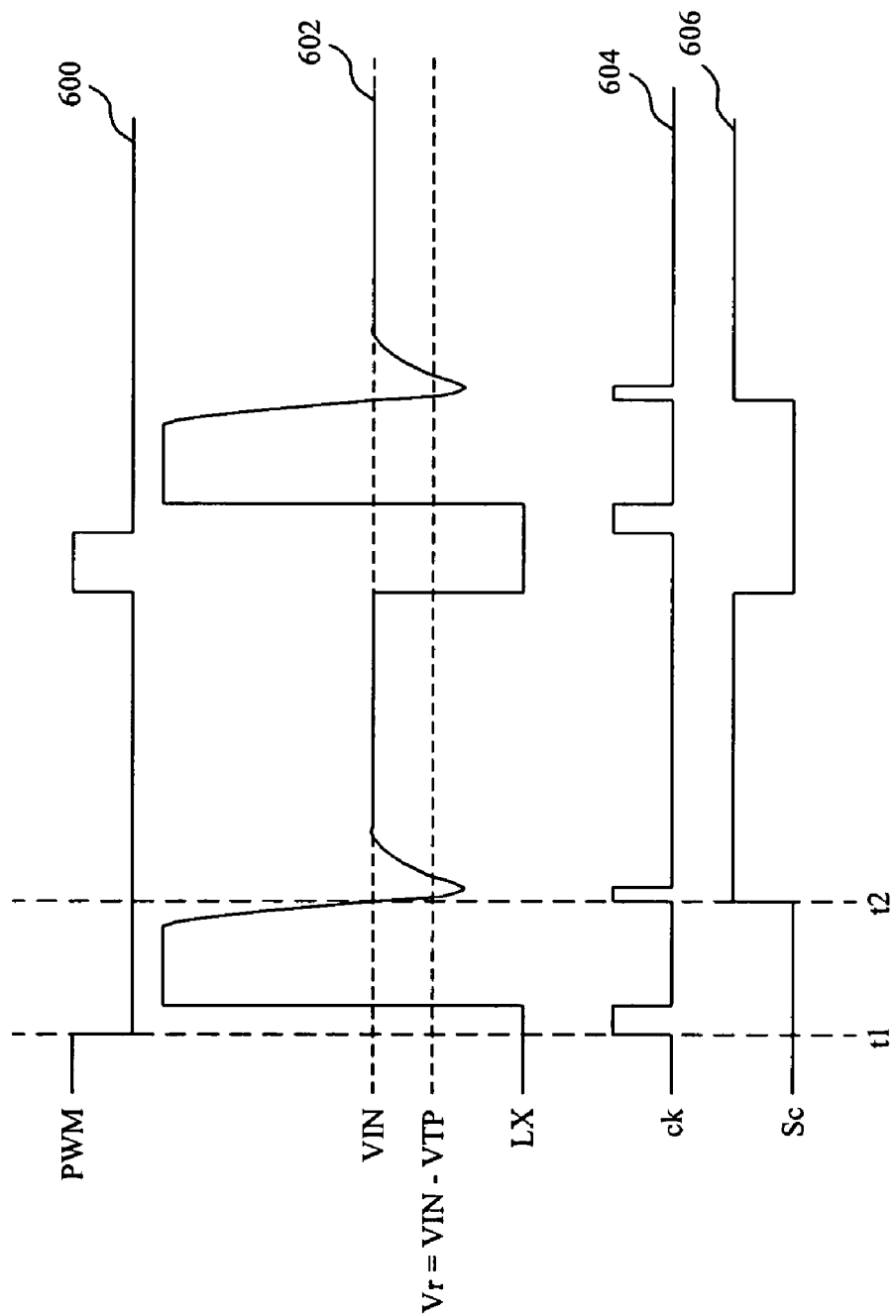
FIG. 16 is a waveform diagram showing the phase node voltage and some corresponding signals in the detector of FIG. 15.

FIG. 16 is a waveform diagram showing the phase node voltage LX and some corresponding signals in the detector 203 of FIG. 15, in which waveform 600 represents the PWM signal, waveform 602 represents the phase node voltage LX, waveform 604 represents the indication signal ck, and waveform 606 represents the detection signal Sc. Referring to FIGS. 7, 15 and 16, at time t1 the PWM signal transits to high, and the 2-bit counter 514 starts to count the indication signal ck. To avoid error operation, in this embodiment, when the 2-bit counter 514 detects the indication signal ck at the first time, it will not assert the detection signal Sc. Then, when the phase node voltage LX becomes lower than the voltage Vr again, as shown at time t2, the indication signal ck is triggered and thus counted by the 2-bit counter 514, causing the 2-bit counter 514 to assert the detection signal Sc to control the charge bypass circuit 202 to establish a bypass path therethrough, thereby maintaining the phase node voltage LX at the level of the input voltage VIN, as shown by the waveform 602. In this embodiment, the detection signal Sc is asserted when the indication signal ck is activated twice. However, in other embodiments, it may have different setting for the threshold counting number.

The detector 203 shown in either FIG. 13 or FIG. 15 can be used together with the charge bypass circuit 202 in either one of FIGS. 8 to 12.

Figure 17:
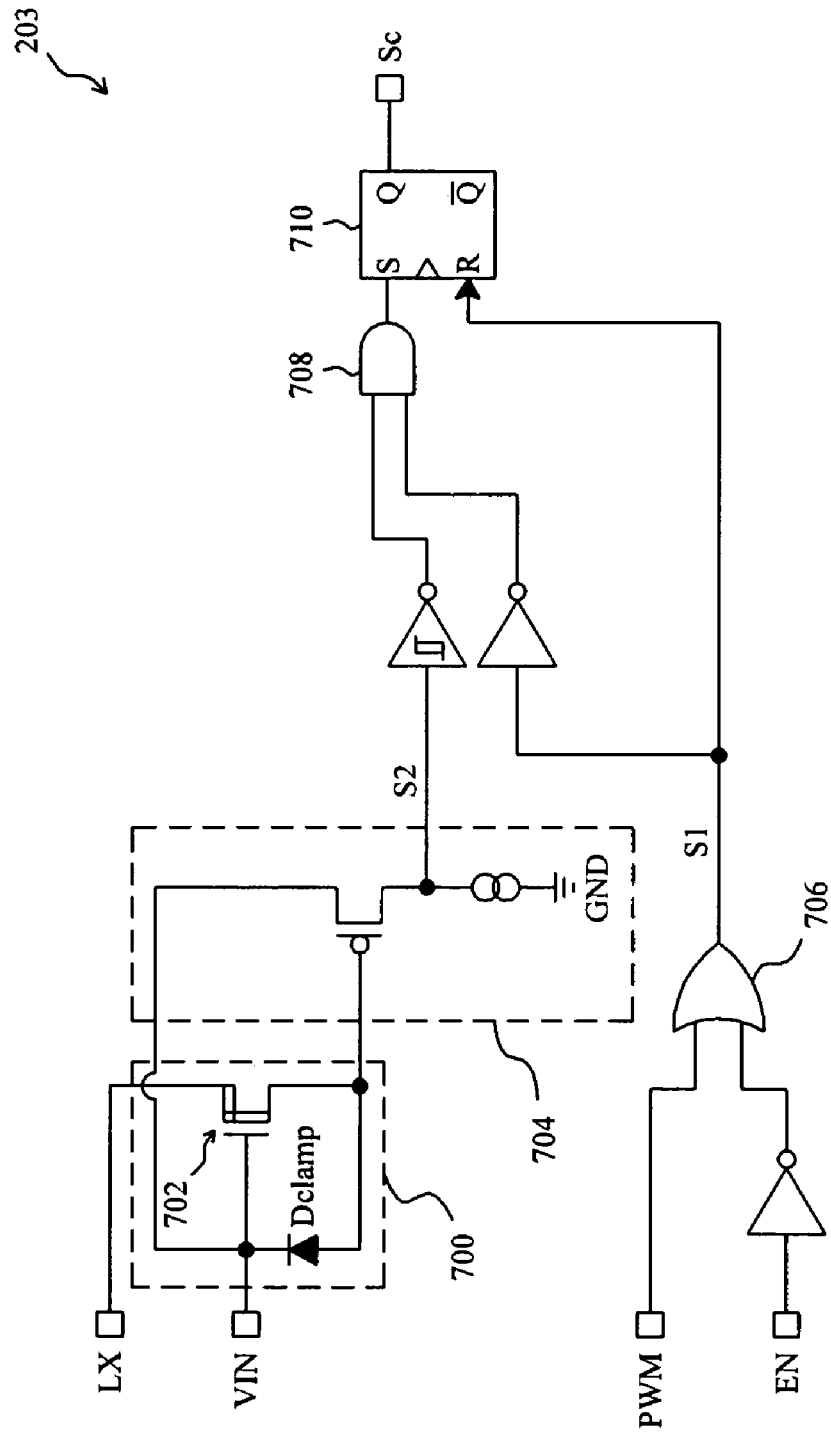
FIG. 17 is a third embodiment for the detector in the converter FIG. 7.
Figure 18:
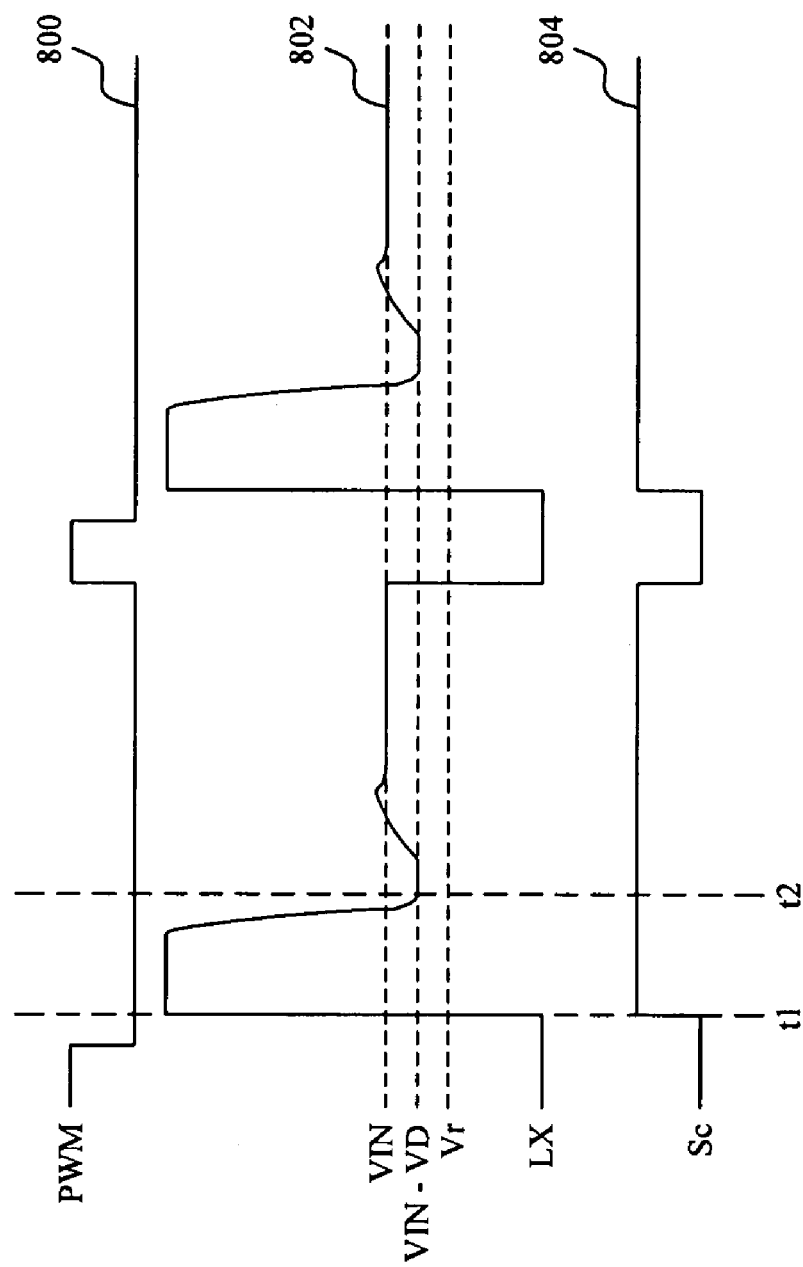
FIG. 18 is a waveform diagram showing the phase node voltage and some corresponding signals in the detector of FIG. 17.

FIG. 17 is a third embodiment for the detector 203 in the converter 200 of FIG. 7, in which a high voltage blocking circuit 700 is connected between the phase node LX and a comparator 704 to isolate high voltage, and the high voltage blocking circuit 700 includes a high voltage NMOS transistor 702 and a diode Dclamp as in the above embodiments. The NMOS transistor 702 is connected between the phase node LX and the comparator 704, and the diode Dclamp is connected between the gate and the source of the NMOS transistor 702. By monitoring the phase node voltage LX, the comparator 704 determines if the power switch N1 turns off and to trigger an indication signal S2. An OR gate 706 generates a signal S1 according the PWM signal and an enable signal EN, an AND gate 708 generates the set signal S for a flip-flop 710 according to the signals S1 and S2, and the flip-flop 702 asserts the detection signal Sc according the output of the AND gate 708 and the signal S1. FIG. 18 is a waveform diagram showing the phase node voltage LX and some corresponding signals in the detector 203 of FIG. 17, in which waveform 800 represents the PWM signal, waveform 802 represents the phase node voltage LX, and waveform 804 represents the detection signal Sc. Referring to FIGS. 12, 17 and 18, after the PWM signal transits to low, as shown at time t1, the power switch N1 turns off, the phase node voltage LX is pulled high accordingly, the flip-flop 710 activates the detection signal Sc to be high due to the signal S1 transiting to low, and the PMOS transistor 236 is turned on by the detection signal Sc. In this case, the diode 240 prevents current flowing from the phase node LX to the power input VIN through the PMOS transistor 236. Thereafter, when the phase node voltage LX falls down to be lower than the input voltage VIN by a forward conductive voltage VD, as shown at time t2, the charge bypass circuit 202 establishes a bypass path therethrough and thereby maintains the phase node voltage LX at the level of the input voltage VIN.

Figure 19:
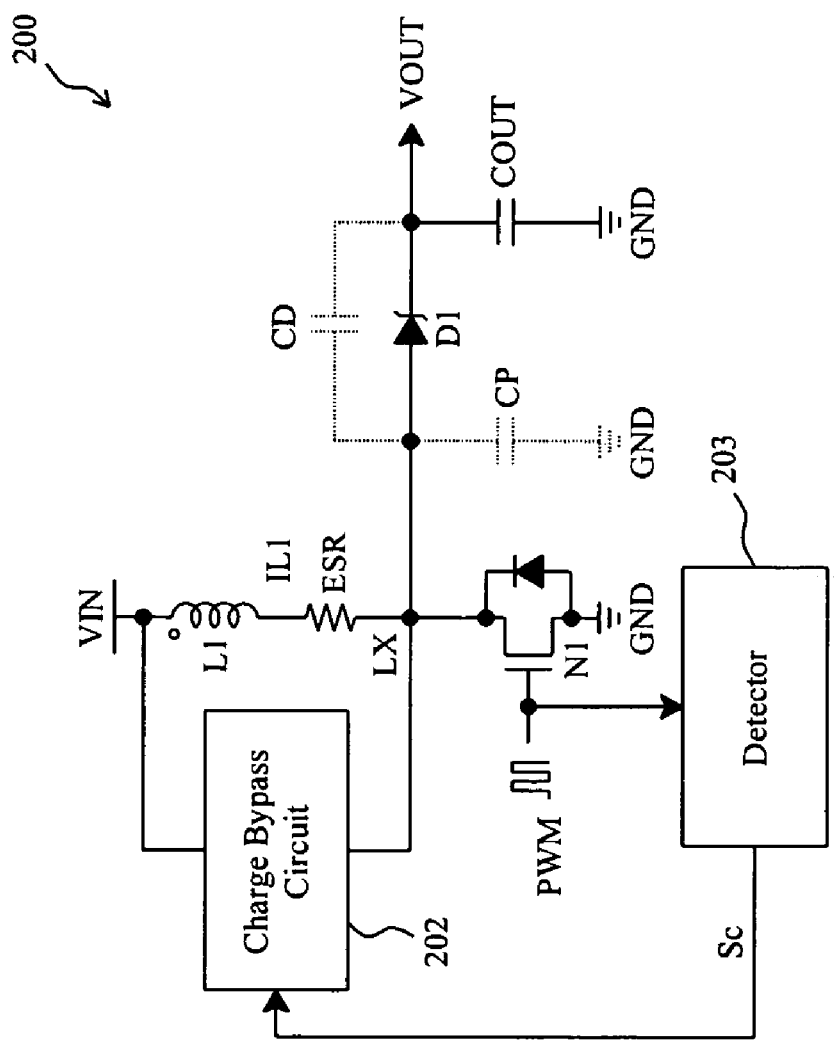
FIG. 19 is a second embodiment of asynchronous boost converter according to the present invention.

In the above embodiments, the detection signal Sc to control the charge bypass circuit 202 to establish a bypass path is determined by monitoring the phase node voltage LX. However, in other embodiments, the detection signal Sc can be determined by other methods. For example, as shown in FIG. 19, the detector 203 monitors the PWM signal instead, in order to assert the detection signal Sc. The detector 203 may, for example, produce the detection signal Sc by delaying or inverting the PWM signal.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An anti-ring asynchronous boost converter having a power input to receive an input voltage, comprising:
    an inductor connected between the power input and a phase node;
    a power switch serially connected to the inductor by the phase node and controlled by a PWM signal;
    a diode connected between the phase node and a power output of the converter; and
    a charge bypass circuit shunt to the inductor;
    wherein the charge bypass circuit establishes a bypass path therethrough in response to a detection signal if a phase node voltage ringing is detected, the charge bypass circuit comprises:
        a switch shunt to the inductor and controlled by the detection signal to establish the bypass path; and
        two transistors serially connected between the power input and the phase node, and both controlled by the detection signal, each of the two transistors has a body diode, and the two body diodes are arranged back to back;
    wherein one of the two transistors is a high voltage transistor and connected between the first transistor and the phase node, whereby bypass current flows from the phase node to the power input through the high voltage transistor when the phase node voltage is higher than the input voltage.

2. The converter of claim 1, wherein the second transistor is a depletion NMOS transistor.

3. The converter of claim 1, wherein the charge bypass circuit further comprises:
    at least one diode connected between a gate of the second transistor and the phase node for clamping the gate voltage of the second transistor;
    a resistor connected between the gate of the second transistor and the phase node;
    a current source; and
    a switch connected between the gate of the second transistor and the current source, and controlled by the detection signal.

4. The converter of claim 1, wherein the charge bypass circuit further comprises a charge pump for providing a gate voltage for the second transistor according to the detection signal.

5. The converter of claim 1, wherein the charge bypass circuit comprises:
    a transistor and a second diode serially connected between the power input and the phase node;
    wherein the transistor is controlled by the detection signal and has a body diode arranged back to back with the second diode.

6. The converter of claim 1, wherein the charge bypass circuit comprises a one-directional bypass path to be established in response to the detection signal.

7. The converter of claim 1, wherein the charge bypass circuit comprises a bi-directional bypass path to be established in response to the detection signal.

8. The converter of claim 1, further comprising a detector for monitoring the PWM signal to assert the detection signal.

9. The converter of claim 1, further comprising a detector for monitoring the phase node voltage to assert the detection signal.

10. The converter of claim 9, wherein the detector comprises:
    a comparator for triggering an indication signal when the phase node voltage reaches a threshold; and
    a logic circuit for asserting the detection signal according to the PWM signal and the indication signal.

11. The converter of claim 10, wherein the detector further comprises a high voltage blocking circuit connected between the phase node and the comparator for isolating high voltage.

12. The converter of claim 11, wherein the high voltage blocking circuit comprises a high voltage transistor connected between the phase node and the comparator.

13. The converter of claim 10, wherein the logic circuit comprises a flip-flop for generating the detection signal according to the PWM signal and the indication signal.

14. The converter of claim 10, wherein the logic circuit comprises a counter for generating the detection signal according to the PWM signal and the indication signal.

15. A detector for a voltage converter having a power input to receive an input voltage and a power switch connected to a phase node and switched by a PWM signal to convert the input voltage to an output voltage, the detector comprising:
    a comparator for triggering an indication signal when a phase node voltage reaches a threshold; and
    a logic circuit for asserting a detection signal according to the PWM signal and the indication signal;
    a high voltage blocking circuit connected between the phase node and the comparator for isolating high voltage, the high voltage blocking circuit comprises a high voltage transistor connected between the phase node and the comparator.

16. The detector of claim 15, wherein the logic circuit comprises a flip-flop for generating the detection signal according to the PWM signal and the indication signal.

17. The detector of claim 16, wherein the flip-flop generates the detection signal only during the PWM signal is at a specific state.

18. The detector of claim 15, wherein the logic circuit comprises a counter for generating the detection signal according to the PWM signal and the indication signal.

19. The detector of claim 18, wherein the counter counts the times that the indication signal occurs during the PWM signal is at a specific state, and generates the detection signal when the counted times reaches a preset number.

20. The detector of claim 15, wherein the detection signal controls a charge bypass circuit to establish a bypass path between the power input and the phase node.

21. A detection method for a voltage converter having a power input to receive an input voltage and a power switch connected to a phase node and switched by a PWM signal to convert the input voltage to an output voltage, the method comprising the steps of:
    monitoring a phase node voltage;

triggering an indication signal when the phase node voltage reaches a threshold; and asserting a detection signal according to the PWM signal and the indication signal, asserting the detection signal comprises the steps of:

counting the indication signal during the PWM signal is at a first state, to thereby obtain a counting value;

asserting the detection signal when the counting value reaches a preset number and until the PWM signal transits to a second state; and resetting the counting value when the PWM signal transits to the second state.

22. The method of claim 21, wherein the step of asserting a detection signal according to the PWM signal and the indication signal comprises the steps of:

blanking the indication signal when the PWM signal is at a first state; and generating the detection signal according to the indication signal during the PWM signal is at a second state.

23. An anti-ring asynchronous boost converter having a power input to receive an input voltage, comprising:

an inductor connected between the power input and a phase node;

a power switch serially connected to the inductor by the phase node and controlled by a PWM signal;

a diode connected between the phase node and a power output of the converter; and a charge bypass circuit shunt to the inductor;

wherein the charge bypass circuit establishes a bypass path therethrough in response to a detection signal if a phase node voltage ringing is detected;

said converter further comprising a detector for monitoring the PWM signal to assert the detection signal, the detector comprises:

a comparator for triggering an indication signal when the phase node voltage reaches a threshold;

a logic circuit for asserting the detection signal according to the PWM signal and the indication signal; and a high voltage blocking circuit connected between the phase node and the comparator for isolating high voltage, the high voltage blocking circuit comprises a high voltage transistor connected between the phase node and the comparator.

24. The converter of claim 23, wherein the charge bypass circuit comprises a switch shunt to the inductor and controlled by the detection signal to establish the bypass path.

25. The converter of claim 23, wherein the charge bypass circuit comprises:

two transistors serially connected between the power input and the phase node, and both controlled by the detection signal;

wherein each of the two transistors has a body diode, and the two body diodes are arranged back to back.

26. The converter of claim 23, wherein the charge bypass circuit comprises:

a transistor and a second diode serially connected between the power input and the phase node;

wherein the transistor is controlled by the detection signal and has a body diode arranged back to back with the second diode.

27. The converter of claim 23, wherein the charge bypass circuit comprises a one-directional bypass path to be established in response to the detection signal.

28. The converter of claim 23, wherein the charge bypass circuit comprises a bi-directional bypass path to be established in response to the detection signal.

29. The converter of claim 23, wherein the logic circuit comprises a flip-flop for generating the detection signal according to the PWM signal and the indication signal.

30. The converter of claim 23, wherein the logic circuit comprises a counter for generating the detection signal according to the PWM signal and the indication signal.

* * * * *